March 5, 1968 J. MERLE 3,371,890
BRAKING DEVICE FOR MOVING BODIES
Filed Oct. 5, 1965 3 Sheets-Sheet 1
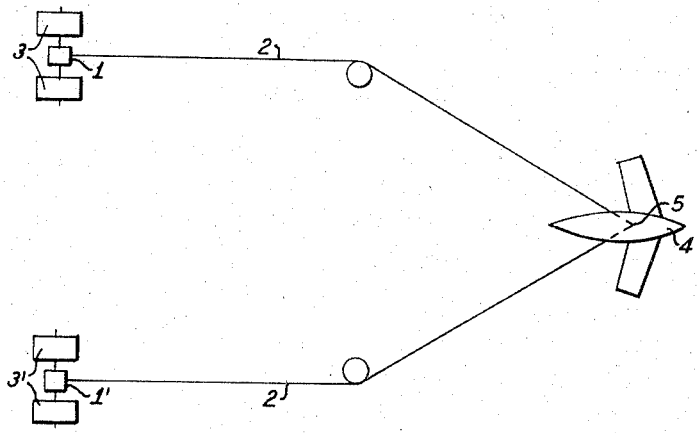
FIG. 1
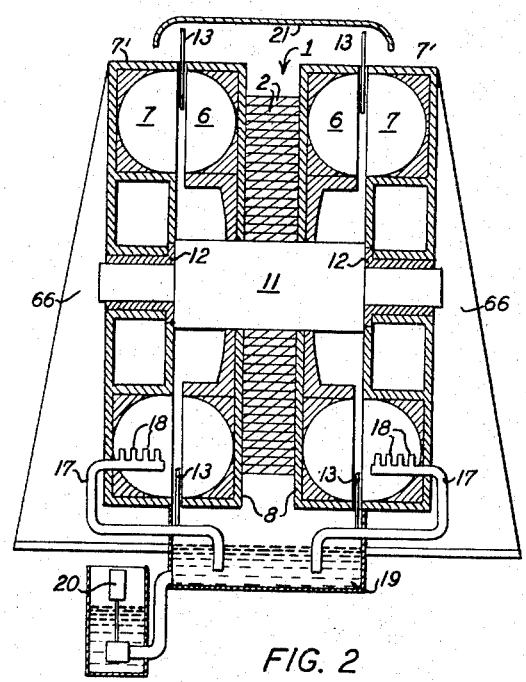
FIG. 2
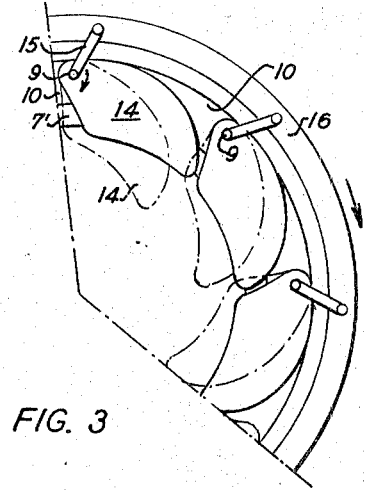
FIG. 3
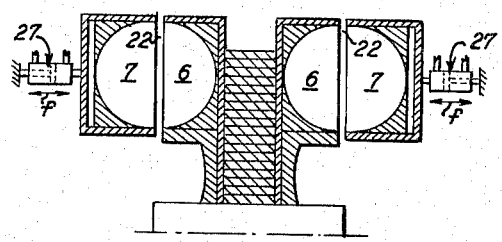
FIG. 4
FIG. 5    FIG. 6
INVENTOR
JEAN MERLE
BY John F. Hart
ATTORNEY INVENTOR
JEAN MERLE
BY John J. Hart
ATTORNEY March 5, 1968 J. MERLE 3,371,890
BRAKING DEVICE FOR MOVING BODIES
Filed Oct. 5, 1965 3 Sheets-Sheet 3

INVENTOR
JEAN MERLE
BY John J. Hart
ATTORNEY

United States Patent Office 3,371,890
Patented Mar. 5, 1968

3,371,890
BRAKING DEVICE FOR MOVING BODIES
Jean Merle, La Tronche, France, assignor to Societe Grenobloise d'Etudes et d'Applications Hydrauliques, Grenoble, France, a corporation of France
Filed Oct. 5, 1965, Ser. No. 493,165
Claims priority, application France, Oct. 5, 1964, 4,726; Oct. 23, 1964, 4,735; Mar. 31, 1965, 4,788
27 Claims. (Cl. 244—110)

ABSTRACT OF THE DISCLOSURE

A braking device for decelerating landing aircraft composed of a drum with a landing cable wound thereon and a rotary air brake comprising an associated stator and rotor, each having on a side thereof a plurality of cells with their openings disposed in opposed, spaced relation to the cell openings of the other, and said stator and rotor being in direct communication with the surrounding atmosphere. Means are provided to regulate the flow of the atmospheric air between the stator and rotor. The air brake is preferably cooled by atomization.

The invention

The present invention relates to improvements in devices intended for stopping moving bodies, and more particularly to a braking device for decelerating landing aircraft.

In the braking devices in general use for arresting landing aircraft, mechanical brakes have been heretofore employed to act on the winding drums for the arresting cable. In recent years it has been found to be more advantageous to replace the mechanical brakes with hydraulic brakes. However, in certain particular applications, the drawbacks encountered in the use of hydraulic brakes may prohibit their utilization. For example, in order to brake the large power which is present at the high angular speeds existing during the braking of aircraft, the liquid utilized in these hydraulic braking machines must be supplied under pressure and such supply must be capable of being effected at low temperatures. This latter requirement is necessitated by the tendency of hydraulic brakes to cavitate when the speeds and power encountered exceed a certain value as a function of the temperature of the water.

In view of the foregoing, it has been found necessary to provide such hydraulic brakes with liquid of a limited temperature which must not be exceeded, if excessive pressures which require extremely strong casings are to be avoided. Accordingly, it is usual to supply fairly large flow-rates of circulating water in the brake to evacuate the heat developed during braking. This great circulation of water has been found to interfere with the correct operation of the brake, and additionally necessitates auxiliary pumps and a fairly large capacity of water. The auxiliary pump can be keyed to the brake shaft and thus form part of the brake. The quantity of water however, must be maintained fairly large so as to permit a number of successive stops of aircraft without an excessive rise in temperature, since a brake receiving hot water would have a tendency to cavitate, even with a circulation under pressure. It would even be desirable to provide an auxiliary cooling circulation of water, especially in hot countries.

By way of example in order to provide an understanding of the magnitude of the problem, it has been found that the water should not pass out of the brake at more than 70° C., which affords a fairly small difference, of the order of 50° C., when the water has an intake temperature of 20° C. As each litre of water will evacuate 50 cal./kg., there will be required about $$\frac{30,000}{50}=600 \text{ litres}$$

to stop an aircraft weighing 30 tons, with an initial speed at braking of 90 m./sec. This water must be cooled for if it becomes mixed with the water which remains in the tank, it will increase the temperature of the latter. Thus, if it is assumed that the tank contains 3,000 litres of water, the whole quantity will be heated up by 20 to 30° C., as a result of the first stop, which will make a greater output of the pump necessary to prevent cavitation when the second stop is made, and so on.

It has been found necessary for certain applications, to avoid the aforesaid drawbacks: namely, risk of cavitation and its consequent unreliability of braking, impossibility of having available a large quantity of water, or of cooling it, and difficulty in obtaining high supply pressures. Accordingly, it is the primary purpose of the present invention to provide in a braking arrangement for aircraft on runways, comprising the unwinding of braking bands or cables from a drum, of an improved braking means which is free of such disadvantages.

In accordance with the invention, the stated purpose is attained by coupling to the braking drum a rotary air brake dimensioned in accordance with its intended use and in direct communication with the surrounding medium. This air brake arrangement has been found to have certain advantages over known installations comprising rotary hydraulic brakes, such as the following:

(1) The brake is not fluid-tight and is used at atmospheric pressure, so that it may be of the most simple construction. For example, it is possible to provide the cells of the stator in the concrete frame of the foundation walls. The absence of pressure makes it possible to employ in the brake only the thicknesses which are needed for the construction of its parts. Consequently, economical methods of manufacture, of the boiler-works type for example, can be employed.

(2) The priming of the air brake is automatic since it is sure to be filled by the ambient air, whereas a leakage is always possible in the circuit of water under pressure in the hydraulic brake, especially during those long periods when the brake is not in use.

(3) Elimination of the risk of cavitation, which leads to reliable operation and permits the blades to be produced with simplified outlines.

(4) Elimination of a large reservoir for cooling water.

(5) Elimination of an auxiliary cooling system, which as has been previously pointed out, is very important in the case of a hydraulic brake, since to stop an aircraft of relatively low weight (30 tons) with an initial braking speed of 90 m./sec., it is necessary for suitable cooling of the brake to provide an output of 600 litres of water which must be cooled before the next braking action.

It has been found necessary to give the air brake a fairly large size, since the specific mass of the air is very low. Thus, an air brake according to the invention will have a diameter substantially two and a half times greater than a hydraulic brake of the same power, as the braking power varies as the fifth power of the diameter.

It has also been found that in the air type of brake, it is necessary for its satisfactory operation to avoid excessive heating of the air or gas which is utilized as the braking fluid. High temperature can in fact lead to deformation and deterioration of the equipment. Furthermore, high temperature inevitably reduces the specific mass of the fluid and consequently the braking capacity for operation at constant pressure. The air brake may be adequately cooled as follows:

(1) By blowing air through the wheels by blowers which may be keyed to the brake shaft. This method necessitates a large quantity of air and may interfere with the internal working of the brake.

(2) By supplying an intake of water or other cooling liquid to the interior of one or more of the cells of the stator. The velocities of the air flow are sufficiently great to ensure good atomization of the supplied water and a uniform temperature.

The aforesaid second arrangement has been found to be very advantageous, since the quantities of water necessary to effect proper cooling are relatively small for the following reasons:

(a) The limiting temperature is high, of the order of 90° C.

(b) While a very small part of the water is vaporized, this quantity is however sufficient to carry away a considerable amount of heat. As the heat of vaporization of water is about 540 times greater than that of air, there would only be required for example 34,000/540 or about 60 litres of water vaporized per stop to brake an aircraft of 30 tons arriving on the runway at a speed of 90 metres per second.

The above is approximate because the phenomenon of heat exchange between air and water is rather complex. The water initially heats up before it is vaporized, while on the other hand, all the water is not vaporized, so that there will be required a little more water than that estimated so as not to reach 90° C., for example. In any case, the quantities of water necessary to effect proper cooling in the air brake will be definitely less than those required by the circulatory systems in hydraulic brakes.

The introduction of water into the air brake can be effected by means of a pump which may advantageously be keyed to the brake shaft, or associated with this shaft by any kinematic chain such as a gear, a coupler, a speed-varying gear, etc.

Tubes or nozzles may also be placed inside the cells of the stator so as to create in these tubes pressures sufficiently low to draw-in water from a reservoir placed slightly below the brake and thereby prevent the tubes from being drained during periods of stoppage. This arrangement is advantageous since it eliminates parts and renders the brake automatic, the priming being ensured by the actual operation of the brake.

The water that is not vaporized, which constitutes the greater part thereof, can be recovered by providing around the brake a light hood capable of catching such water and returning it to the tank. The recovered water will increase the temperature of the water in the tank, but this is not a disadvantage as it would be in the case of the hydraulic brake, since the cooling of the air brake is mainly accomplished by the vaporization of the water and it is therefore not necessary to inject cold water into the system.

The regulation of the output of this brake can be effected by slide-valves or screens movable in the air gap between the stator and rotor. These regulators can slide as in hydraulic brakes or, in order to avoid excessive size, they may be constituted by a number of flaps or shutters forming a variable opening. These regulators may also be in the form of jaws that are articulated at one of their extremities and actuated at their other extremity by a means arranged to move them closer to the center of the brake.

The regulation of the air brake power can also be effected in accordance with the invention:

By variation of the axial play between stator and rotor;
By closure of the axial space between stator and rotor, carried out at the periphery of these latter; and
By closure of orifices formed at the periphery of the stator blades.

It is preferred in the practice of the invention that the air-brake comprise two rotors associated with two stators; the arrangement being symmetrical with respect to a plane perpendicular to the axis of rotation of the whole unit. In one form of such symmetrical construction, the stators may be arranged outside the rotors which form the cable drum between them, while in an alternative form, two cable drums are provided and these are arranged on the outside of the rotors, the latter in turn being arranged outside the stators. In such alternative form, the apparatus may comprise a single and symmetrical central frame for carrying the two stators of the brake; the lateral cable drums being connected directly to the brake rotors, and a supporting shaft for the cable drums and rotors passes straight through the apparatus. In such an arrangement, the brake rotors may be locked onto the shaft, in which case it is desirable to couple the two winding bands to the hooking cable by an additive load-distribution device, such as a known compensation bar or a single pulley block. Such a device is necessary in order to compensate either for differences of travel of the bands, or for differences in the elasticity of the said bands. The brake rotors may also be mounted so as to be freely rotatable on the shaft, in which case the coupling of the bands can be made directly to the extremity of the hooking cable without any special load-distribution device.

In the case where the rotors are rigidly fixed onto the shaft with a coupling compensation bar, this take-up of load is effected automatically by the pivotal movement of the compensation bar. The construction with a single pulley block on the other hand necessitates an arresting device on the cable, oval stops for example, so as to block its movement. On the other hand, when the rotors are mounted freely rotatable on the shaft, the take-up of load will obviously only take place with half the braking force, since only one of the two brakes will remain in operation.

The aforesaid alternative form of symmetrical arrangement has the following advantages:

(1) The central frame carrying the stators and the bearing or bearings, may be made of one-piece construction.

(2) The drums and rotors can be directly removable laterally, one after the other. It is possible therefore to change a drum, if necessary carrying with it its wound cable, without difficulty in the same way as one would change an automobile wheel.

(3) Since the moving vehicle is coupled to the braking device by two bands instead of one, the following additional advantages are obtained:

(a) Each of the two bands withstands a normal load which is one-half the total load, and this enables the extension of the upper limit to which braking devices of high power are normally restricted; and (b) As the normal load of one band generally corresponds to a large coefficient of safety with respect to fracture, it is possible to avoid a complete breakdown in the case of an accidental breaking of either one of the two bands, by having the second band take up the load.

The objects, characteristic features and advantages of the invention will become more apparent from the description which follows below of forms of construction chosen by way of example, reference being made to the accompanying drawings, in which:

FIG. 1 is a diagrammatic top plan view of a braking installation for landing aircraft on a runway and in accordance with the invention is provided with rotary airbrakes;

FIG. 2 is a view in vertical cross-section showing in greater detail a symmetrically constructed air-brake embodying the invention coupled to an unwinding drum for a braking band in the type of installation shown in FIG. 1, the air-brake illustrated being composed of two stators arranged outside the rotors which form the cable drum between them;

FIG. 3 is a partial side elevational view showing on an enlarged scale the regulating slides for regulating the braking power of the air brake shown in FIG. 2;

FIG. 4 is a partial vertical sectional view of the air brake blades showing the manner in which the power of the brake may be regulated by variation of the axial clearance between the blades;

FIG. 5 is a partial detail sectional view showing another method of controlling the axial clearance between the blades;

FIG. 6 is a view similar to FIG. 5 and showing how the means of the latter can be employed to control orifices in the stator blades;

Figure 8:
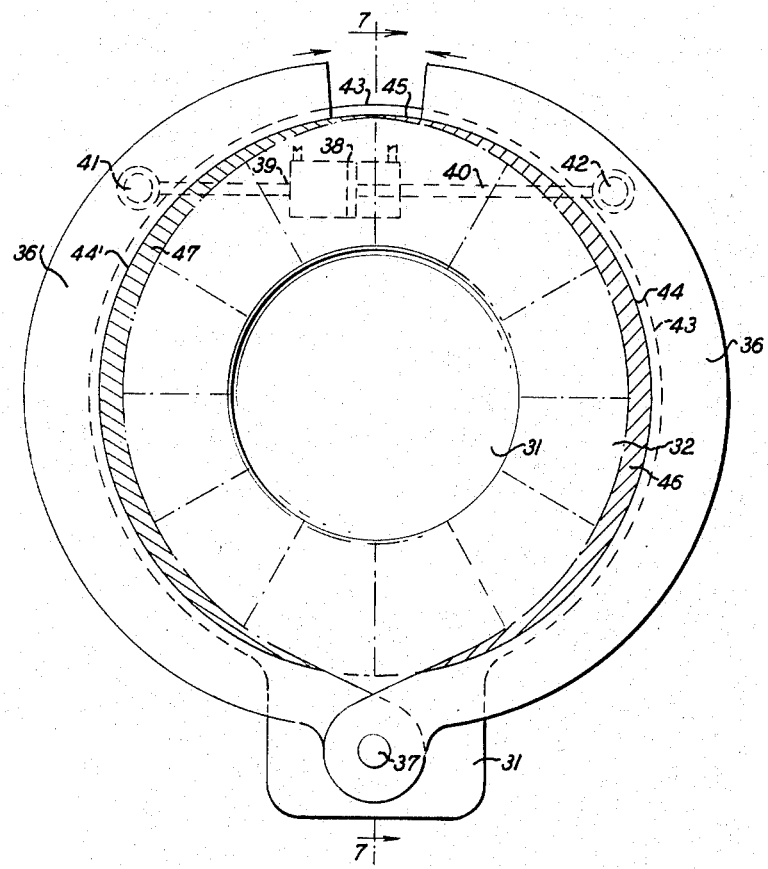
FIG. 8 is a sectional view taken along the line 8—8 of FIG. 7.

In the installation shown in FIG. 1 of the drawings, the braking device for the aircraft 4 landing on the runway, is constituted of two braking units embodying the invention; each of such units comprising a drum 1 and 1', from which unwinds a cable 2 in the form of a band. Each of the drums 1, 1' is located between and rigidly fixed to a pair of rotary air-brakes 3, 3 and 3', 3', respectively. As it lands, the aircraft 4 becomes hooked at 5 onto the band 2 which unwinds under the braking action of the air-brakes to decelerate the aircraft to a stop.

As is shown more clearly in FIG. 2 of the drawings, each of the braking units constituted on a drum 1 or 1' and the air brakes 3, 3 or 3', 3', respectively, is composed of a double rotor 6, 6 associated with stators 7, 7 which are mounted on the outer sides of the rotors with the cells thereof in opposed relation. The end-plates 8, 8 of the rotors serve as the cheeks of the winding drum 1 or 1' for the band 2. In this arrangement, the torque is transmitted directly from the band 2 to the hub 11, to the latter of which the inner end of band 2 is secured. The rotor shaft is carried by bearings 12, 12 fixed on the bodies of the stators 7.

Located in the spaces between the associated rotors 6 and stators 7 are sliding members 13 for controlling the passage of air between the cells thereof, and thus enabling the braking power of the braking units to be regulated. These sliding members 13, as is shown in FIG. 3 of the drawings, may be in the form of shutters 14 pivotally connected by pins 9 to outwardly projecting flanges 10 provided on the outer walls 7' of the stators 7 adjacent to the inner edges of such walls which define the air gaps between such stators and the rotors 6. As is indicated in FIG. 3 the shutters 14 are arranged in adjacent circular relation on the flanges 10 so that in the outermost or full opening positions of such shutters, the inner edges thereof will coincide with the areas encircled by the outer stator walls 7' and within which are located the cells of the air-brake. The shutters 14 are actuated to closed position, indicated in dotted outline in FIG. 3 of the drawings, to reduce the braking power of the brake unit by crank arms 15 connected to the pins 9 and operated by a regulating ring 16. These shutters may also have the form of slides similar to those generally employed on hydraulic brakes.

Cooling of the air-brakes is effected by water intake tubes 17 which extend from a storage tank 19 into one or more cells of the stator and which are provided with discharge holes or orifices 18 within such cells. The orientation and the positions of the holes 18 in these tubes 17 with respect to the cells are determined so as to take maximum advantage of the areas of minimum pressure created in such cells when the air-brakes are in operation. The water is thus naturally sucked-in from the storage tank 19 during such operation. The tank or reservoir 19 of water may be supplied periodically from any suitable source such as a tank lorry, or from a natural source with the aid of a motor pump 20 capable of ensuring a constant level of water in the tank 19. An annular hood 21 enclosing the brake unit enables the water to be recovered and returned to the tank 19.

The regulation of the power of the brake in an air-brake such as that illustrated in FIG. 1 of the drawings can be effected also by varying the axial clearance between the associated rotors 6 and stators 7. As shown in FIG. 4 of the drawings the air-gap 22 between the stators 7 and the rotors 6 may be varied by axially displacing one or both the stators in the directions of the arrows $f$, by means of hydraulic jacks 27, 27 connected to a suitable source of hydraulic fluid and operated in a known manner.

This type of regulation of the brake power can also be effected by means of the arrangement shown in FIG. 5, whereby the axial clearance at the periphery 23 between the associated stators 7 and the rotors 6 is closed by means of a ring 24 which is moved in the direction of the arrows $f1$ in any suitable manner or manually. Such a ring or sleeve may also be employed to control openings or orifices in the stators 7 and thereby regulate the brake power. Thus as is shown in FIG. 6 of the drawings, the power of the brake is regulated by closing to a greater or lesser extent orifices 26 provided at the periphery of the stator blading 7 by means of a sleeve 25 which is axially displaced in the direction of the arrows $f2$. It will also be understood that these orifices 26 can be closed by means of a sleeve which is rotatably movable and which is provided with orifices corresponding to the orifices 26 of the stator blading.

Figure 7:
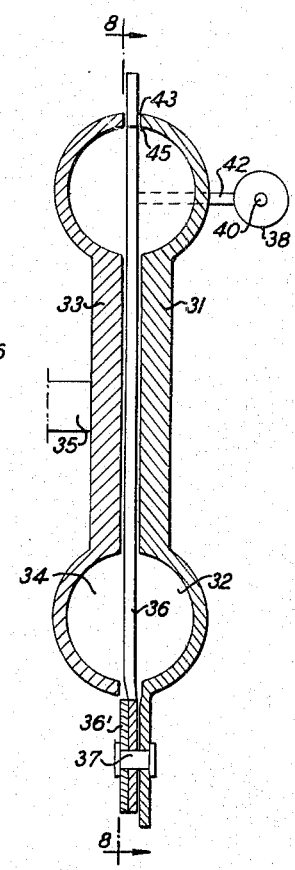
FIG. 7 is a view taken in axial section along the line 7—7 of FIG. 8 and showing the employment of articulated jaws for regulating the braking power.

As previously indicated, the sliding members or screens 13 may be in the form of jaws which are articulated at one of their extremities and actuated at their other extremity to vary their positions relative to the center of the brake. Such a construction is shown in FIGS. 7 and 8 of the drawings, wherein the numeral 31 indicated the stator of an air brake and the numeral 33 the rotor of such brake mounted for rotational movement on the shaft 35. The power regulating screens 36, 36' are located between the chambers 32 of the stator and the chambers 34 of the rotor. As is shown more clearly in FIG. 8, the screens 36, 36' which are in the form of jaws, are pivotally mounted on a shaft 37 fixed to the stator 31. The jaws are opened and closed by a double acting hydraulic jack 38 which is mounted behind the stator 31 and has the extremity 39 of the body thereof and its rod 40 coupled respectively to posts 41 and 42 rigidly fixed on the jaws 36' and 36, respectively. The jack 38 is connected in a known manner to a suitable source of hydraulic fluid and its operation is controlled as usual in the art. There may be provided a simple synchronization device for the movement of the two jaws and constituted for example by a known triangulation system coupling them to each other.

It will be noted that in FIGS. 7 and 8 of the drawings the jaws 36, 36' are shown in their fully opened positions, with their inner edges 44, 44', respectively, coinciding with the inner peripheral edge 45 of the stator; the outer peripheral edge of the stator being indicated by the reference numeral 43. The inner edge 45 of the stator also defines the outer boundaries of the chambers 32 and 34 of the stator 31 and rotor 33, respectively. The shaded portions 46 and 47 of FIG. 8 of the drawings represent closure zones for the jaws 36, 36' when the latter are in positions of partial closure corresponding to a reduction of the braking power of about 60%. It will be understood that when the air brake operates between its full power and 40% of that value the closure positions of the inner edges 44, 44' of the jaws 36, 36', respectively, will be positioned in the shaded zones 46 and 47. Thus, at full power the jaws will be fully opened and their inner edges 44, 44' will define an area corresponding to that defined by the inner peripheral edges 45 of the stator and the rotor, while at progressively lower powers down to 40% of full power, the inner edges 44, 44' of the jaws will progressively approach the inner boundaries of the closure zones 46 and 47. It will be noted that throughout such movements of the jaws 36, 36' the inner edges 44, 44' thereof and consequently the closure zones 46, 47 defined by such jaws in the various positions thereof, will remain substantially symmetrical with respect to the shaft 5 of the brake. As indicated in FIG. 8 of the drawings the travel of the jaws to effect a reduction of the braking power to 40% of its full power is relatively small. When the jaws are moved to their completely closed positions the braking power will be reduced to zero.

Figure 9:
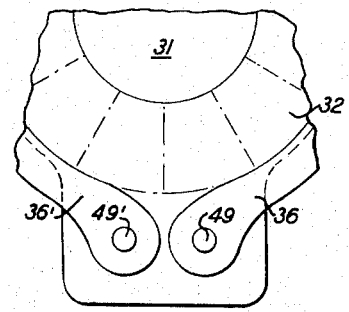
FIG. 9 is a partial view illustrating another manner in which the jaws may be pivotally mounted.

FIG. 9 of the drawings, illustrates how the jaws 36, 36' may be mounted on separate shafts 49, 49' rigidly secured to the stator 31 instead of an a single shaft 37 as shown in FIG. 8.

Figures 10, 11:
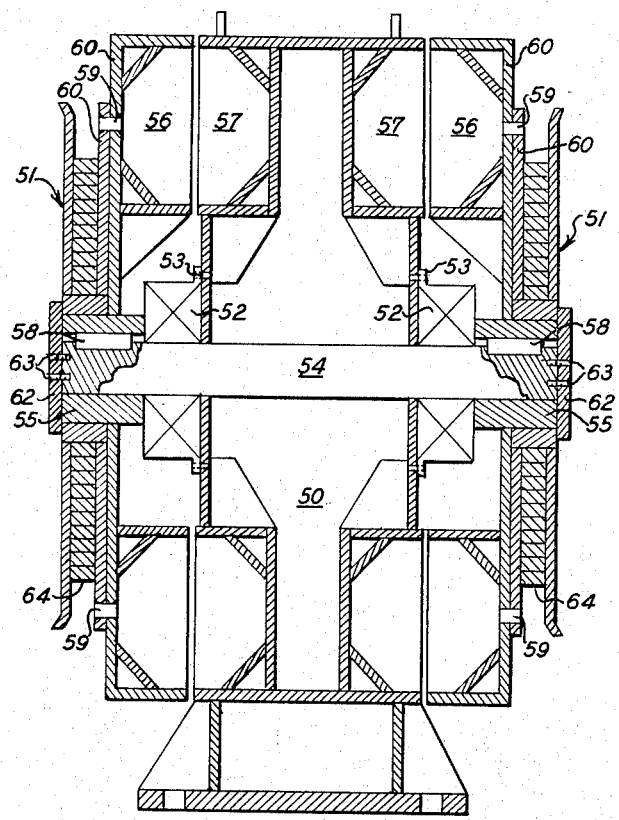
FIG. 10 is a view in vertical cross-section of another embodiment of the invention in which the cable drums and rotors are arranged outside the stators.
FIG. 11 is a partial view similar to FIG. 2 showing a modified shaft and bearing construction of the embodiment of FIG. 2.

The embodiment shown in FIG. 10 of the drawings, like the apparatus of FIG. 2, is symmetrical with respect to a plane perpendicular to the axis of rotation of the rotor shaft, but differs from such apparatus in the respects that the rotors 56, 56 thereof are arranged outside the stators 57, 57 and two winding drums 51, 51 are provided on the rotors. The apparatus of FIG. 10 is composed of a central frame 50 carrying two lateral bearings 52, 52 fixed thereto in any suitable manner, as by means of screws 53. The frame 50 also carries the stators 57, 57 of the brake. Extending through the frame 50 and bearings 52, 52 is a shaft 54 on the projecting end portions of which are mounted the rotors 56, 56, the hubs 55, 55 of which are connected to the shaft 54 by keys 58. 58. The cable drums 51, 51 are mounted on the hubs 55, 55 of the rotors and are fixed with relation to the rotors by means of studs 59, 59 carried by the end plates 60, 60 of such rotors and engaging orifices provided in the end plates 61, 61 of the cable drums, and by means of the end plates 62, 62 which are fixed on the shaft 54 by means of screws 63.

It will be noted that as a result of the symmetrical structure of FIG. 10, this structure like that of FIG. 2 will not be subjected to torsion or flexion stresses. The shaft 54 serves solely as a support for the rotor-drum assemblies and ensures between them a coupling which only transmits a torque representing the difference between the forces due to the two bands or cables 64, 64 in the drums 51, 51. As the two drums 51, 51 are connected directly to the rotors 56, 56, there will be no torsion stresses applied thereby to the shaft 54. It will also be noted that this construction readily lends itself to the disassembling of the parts. The two drums 51, 51 can be readily removed and replaced by simply removing the end plates 62 and disengaging such drums from the studs 59 by an outward pull. The rotors 56 can then be pulled off the end portions of the shaft 54 which may then be removed by pulling it through the bearings 52, 52. The bearings themselves may then be disconnected from the central frame 50 by loosening the screws 53.

It is contemplated that a somewhat similar shaft and bearing construction may be employed in the embodiment of FIG. 2 to facilitate the disassembly of the parts thereof. Thus as shown in FIG. 11 of the drawings, the construction of FIG. 2 may be modified to include a straight shaft 65 keyed to the hub 11' forming with the end plates 8', 8' the drum for cable 2, and extending through the bearings 12', 12' which are shown detachably connected to the stators 7', 7'. The shaft is maintained in proper relation to the parts by the lateral frame members 66, 66 which support the stators 7', 7' and which can be removed to permit disassembly of the parts.

While I have hereinabove described and illustrated in the drawings preferred embodiments of the invention, it will be apparent to those skilled in the art that various changes may be made without departing from the spirit of the invention, or the scope of the appended claims.

I claim:

1. A braking unit comprising torque applying means, and a rotary air brake coupled to said torque applying means, said air brake comprising a rotatable shaft, and an associated stator and rotor each having on a side thereof a plurality of cells with their openings disposed in opposed, spaced relation to the cell openings of the other, said stator and rotor being open and being exposed to the surrounding atmosphere so that the working fluid of said air brake is composed of atmospheric air passing through the space between the peripheries of said stator and rotor to said cells thereof, and so that said air brake is substantially cooled by the atmospheric air, the shaft of said air brake extending through said rotor, stator and torque applying means, and said torque applying means being located on said shaft adjacent to said rotor so that the latter is positioned between said torque applying means and said stator.

2. A braking unit such as defined in claim 1, including means for regulating the braking power of said air brake by controlling the flow of air passing from the atmosphere and through the space between the peripheries of said stator and rotor to the cells thereof during the braking operation of said air brake.

3. A braking unit such as defined in claim 2, in which said power regulating means is movably mounted on said stator and operable to control the flow of air through the space between the opposed cells of said stator and rotor.

4. A braking unit such as defined in claim 3, in which said power regulating means comprises a plurality of members located in the clearance space between the opposed cells of said rotor and stator, means supporting said members on said stator for movement between such opposed cells toward and away from the axis of rotation of said rotor, and means operable to move said members through a range of movement corresponding to the range of brake power to be controlled thereby.

5. A braking unit such as defined in claim 4, in which said members are in the form of shutters arranged in circular relation between the peripheries of said rotor and stator and having arcuately-shaped inner edges defining an area corresponding to the full power position of such shutters in the retracted positions of such shutters, said supporting means supporting each of said shutters for pivotal movement about one end thereof, and said operable means pivotally advancing said shutters from said retracted positions and about said supporting means towards said rotor axis to reduce the power of said brake.

6. A braking unit such as defined in claim 4, in which said members are in the form of a pair of jaws having arcuately-shaped inner edges defining an area corresponding to the full power position of such jaws in the retracted positions thereof, said jaws being positioned on diametrically opposite sides of said rotor and stator with the inner edges thereof in opposed relation, said supporting means supporting said jaws for pivotal movement at one end thereof about a common axis, and said operable means being connected to said jaws at points substantially spaced from said supported ends thereof and operable to advance the same from said retracted positions towards each other to reduce the power of said brake.

7. A braking unit such as defined in claim 3, in which said regulating means comprises means for controlling the axial space between the rotor and the stator at the peripheries thereof.

8. A braking unit such as defined in claim 3, in which said regulating means comprises means for controlling the openings of a plurality of orifices formed at the periphery of the stator blades of said air-brake and bringing the interior of such stator into communication with the atmosphere.

9. A braking unit such as defined in claim 2, including means supporting said stator for axial movement relative to said rotor, and in which said regulating means comprises means for moving said stator on said supporting means relative to said rotor to vary the air clearance between said stator and rotor.

10. A braking device comprising a rotary air-brake as defined in claim 2 in which said regulating means comprises a plurality of members located between said stator and rotor at the peripheries thereof and movable from retracted positions corresponding to the full power of said brake inwardly toward the axis of rotation of such rotor to advanced positions corresponding to a given reduced power of said brake.

11. A braking device as defined in claim 10, in which said members are in the form of shutters and are arranged in circular fashion around the peripheral end portions of said stator and rotor, means supporting each of said shutters for pivotal movement on said stator comprising an outwardly projecting flange on the periphery of said stator and pins pivotally mounted on said flange and connected to the outer ends of said shutters a regulating ring adjacent to and concentric with said flange and encircling the connected ends of said shutters, and crank arms connecting said pins to said regulating ring and operable on circular movemet of said regulating ring to pivotally move said shutters through said pins.

12. A braking device as defined in claim 10, in which said members are in the form of a pair of arcuately-shaped jaws, said jaws being positioned on diametrically opposite sides of said rotor and stator with the inner edges thereof in opposed relation, means supporting said jaws for pivotal movement toward and away from each other about one end thereof, and means connected to said jaws at points substantially spaced from such supported ends and operable to move said jaws toward and away from each other with a symmetrical pivotal movement relative to said rotor axis.

13. A braking unit as defined in claim 1, in which said unit is provided with two torque applying means, each mounted on one outer end portion of said brake shaft.

14. A braking unit as defined in claim 13, in which each of said torque applying means comprises a drum having a cable wound thereon and means connecting each of said drums to an outer end portion of said brake shaft.

15. A braking unit as defined in claim 1, in which said cells are circularly arranged on the outer peripheral edge portions of said stator and rotors, and means mounted on the central portion of said stator for rotatably supporting said rotor shaft.

16. A braking unit as defined in claim 1, including means for supplementing and cooling the working fluid in said air brake comprising a source of atomizable cooling liquid located outside said air brake, conduit means for conducting such cooling liquid from such source into the cavity of at least one of the cells of said stator, and means provided on said conduit means in the space within said stator for promoting atomization of the cooling liquid into the atmospheric air in such space to provide a cooled working fluid composed of a mixture of atmospheric air and atomized liquid.

17. A braking device as claimed in claim 1, including means for regulating the braking power of said air brake by controlling the flow of the atmospheric air between the opposed cells of said stator and rotor thereof, said regulating means comprising a pair of movable, arcuately-shaped jaws positioned on diametrically opposite sides of said rotor and stator with the inner edges thereof in opposed relation, a hydraulic jack located between said jaws, means connecting the body of said hydraulic jack to one of said jaws, means for connecting the movable rod of said jack to the other of said jaws, and means for operating said jack to move said jaws from retracted positions corresponding to the full power of said brake inwardly toward the axis of rotation of said rotor to advanced positions corresponding to desired reductions in the power of said brake.

18. A braking unit as defined in claim 1, in which said unit is composed of a centrally located rotor having two sets of parallel oppositely disposed cells located in spaced relation, and having two stators on the outer sides of said rotor and each having a plurality of cells in opposed, spaced relation to a set of the cells on said rotor, said torque applying means being located on said rotor between said spaced sets of cells thereof.

19. A braking unit as defined in claim 1, in which said torque applying means comprises rotatable drum means provided with at least one cable which is unwound therefrom at a varying radius when force is applied to such cable, in which said air brake is coupled to said drum means so as to retard rotation of said drum means by the unwinding cable, and in which said air brake comprises two rotors, two stators associated with said rotors, all four of said rotors and stators being in opposed spaced relation to establish direct communication with the surrounding atmosphere and capable of being substantially cooled by atmospheric air, and a shaft extending through said rotors, stators and drum means, said rotors being located on said shaft intermediate said drum means and said stators, and said drum means, rotors and stators being symmetrically arranged with respect to a plane perpendicular to the axis of rotation of said shaft.

20. A braking unit as defined in claim 19, in which said drum means is formed between said two rotors, the end plates of said rotors constituting the cheeks of said drum, and in which said stators are mounted on the outer sides of said rotors with the cells of each stator disposed inwardly in opposed relation to the cells of an associated rotor.

21. A braking unit as defined in claim 19, in which said rotors are mounted on the outer sides of said stators with the cells of each rotor disposed inwardly in opposed relation to the cells of an associated stator, and in which said drum means is composed of two drums, each mounted on the outer sides of said rotors, and means connecting said drums to said rotors.

22. A braking unit as defined in claim 19, including bearings mounted on said stators and rotatably supporting said shaft inwardly of the outer ends of the latter, and means for detachably connecting said rotors and drum means to said shaft.

23. A braking device as claimed in claim 19, including means for regulating the braking power of said air brake by controlling the flow of the atmospheric air between the opposed cells of said associated stators and rotors, said regulating means comprising a pair of movable, arcuately-shaped jaws positioned in the space between an associated stator and rotor and on diametrically opposite sides of said rotor and stator with the inner, concaved edges of such jaws in opposed relation, a hydraulic jack located between said jaws, means connecting the body of said hydraulic jack to one of said jaws, means for connecting the movable rod of said jack to the other of said jaws, and means for operating said jack to move said jaws from retracted positions corresponding to the full power of said brake inwardly toward the axis of rotation of said rotor to advanced positions corresponding to desired reductions in the power of said brake.

24. A braking unit as defined in claim 1, in which said brake shaft is of uniform diameter throughout its length, a key connecting said brake to said brake shaft, and means for maintaining said rotor in properly keyed position on said shaft.

25. A braking unit as defined in claim 24, in which said torque applying means is mounted on an end portion of said brake shaft so that said brake is located between such means and said stator, and in which said maintaining means comprises means for detachably connecting said torque applying means to said rotor, and means for detachably connecting said torque applying means to said end portion of said rotor shaft.

26. A braking unit comprising a drum provided with a cable which is unwound therefrom at a varying radius when force is applied to such cable by a landing aircraft, and a rotary air-brake coupled to said drum and capable of retarding rotation of said drum by the unwinding cable, said air-brake comprising an associated stator and rotor in direct communication with the surrounding atmosphere and capable of being substantially cooled by the atmospheric air, the shaft of said rotor extending through said drum and the end plate of said rotor forming one cheek of said drum, said cable being connected to said rotor shaft so that the torque is transmitted directly from said cable to said rotor shaft.

27. A braking device comprising a rotary air-brake composed of an associated stator and rotor in direct communication with the surrounding atmosphere, and means for regulating the braking power of said air-brake by controlling the flow of the atmospheric air between said stator and rotor thereof, said regulating means comprising a plurality of members located between said stator and rotor at the peripheries thereof and movable from retracted positions corresponding to the full power of said brake inwardly toward the axis of rotation of such rotor to advanced positions corresponding to a given reduced power of said brake, said members being in the form of a pair of arcuately-shaped jaws, means supporting said jaws for pivotal movement about one end thereof, and means connected to said jaws at points substantially spaced from such supported ends and operable to move said jaws with a symmetrical pivotal movement relative to said rotor axis, said operable means comprising a jack having one end of the body thereof connected to one of said jaws and having the movable rod thereof connected to the other of said jaws.

References Cited

UNITED STATES PATENTS

| | | | |
|---|---|---|---|
| 2,415,670 | 2/1947 | Black et al. | 188—90 |
| 2,634,830 | 4/1953 | Cline | 188—90 |
| 2,958,399 | 11/1960 | Osborne | 188—264 X |
| 3,072,222 | 1/1963 | Kugel et al. | 188—90 |
| 3,140,761 | 7/1964 | Doolittle | 244—110 X |
| 3,158,231 | 11/1964 | Marti | 188—90 |
| 3,220,216 | 11/1965 | Byrne et al. | 244—110 X |

MILTON BUCHLER, *Primary Examiner.*

FERGUS S. MIDDLETON, *Examiner.*

P. E. SAUBERER, *Assistant Examiner.*

UNITED STATES PATENT OFFICE
CERTIFICATE OF CORRECTION

Patent No. 3,371,890                          March 5, 1968

Jean Merle

It is certified that error appears in the above identified patent and that said Letters Patent are hereby corrected as shown below:

Column 7, line 20, "an" should read -- on --. Column 9, line 11, cancel "comprising a rotary air-brake". Column 11, line 3, "brake" should read -- rotor --; line 8, "rotor" should read -- brake --.

Signed and sealed this 9th day of December 1969.

(SEAL)
Attest:

Edward M. Fletcher, Jr.                      WILLIAM E. SCHUYLER, JR.
Attesting Officer                                Commissioner of Patents